United States Patent
O'Rorke et al.

(10) Patent No.: US 12,140,079 B2
(45) Date of Patent: Nov. 12, 2024

(54) FLUID DELIVERY SYSTEM

(71) Applicant: Hamilton Sundstrand Corporation (HSC), Charlotte, NC (US)

(72) Inventors: Morgan O'Rorke, West Hartford, CT (US); Ryan Susca, Windsor, CT (US); Todd Haugsjaahabink, Springfield, MA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/537,355

(22) Filed: Nov. 29, 2021

(65) Prior Publication Data

US 2023/0167771 A1    Jun. 1, 2023

(51) Int. Cl.
| | |
|---|---|
| *F02C 7/232* | (2006.01) |
| *F02C 7/236* | (2006.01) |
| *F02C 9/24* | (2006.01) |
| *F02C 9/26* | (2006.01) |
| *F02C 9/28* | (2006.01) |

(52) U.S. Cl.
CPC ............. *F02C 7/232* (2013.01); *F02C 7/236* (2013.01); *F02C 9/24* (2013.01); *F02C 9/263* (2013.01); *F02C 9/28* (2013.01); *F05D 2220/32* (2013.01); *F05D 2260/606* (2013.01)

(58) Field of Classification Search
CPC .... F02C 9/263; F02C 9/30; F02C 9/36; F02C 9/40; F02C 7/222; F02C 7/232
See application file for complete search history.

(56) References Cited

U.S. PATENT DOCUMENTS

| | | | |
|---|---|---|---|
| 6,655,151 B2 | 12/2003 | Mahoney et al. | |
| 9,234,465 B2 | 1/2016 | Futa et al. | |
| 9,353,688 B2 | 5/2016 | Futa et al. | |
| 9,771,906 B2 | 9/2017 | Henson | |
| 10,330,023 B2 | 6/2019 | Selstad et al. | |
| 10,450,961 B2 | 10/2019 | Marocchini et al. | |
| 10,590,859 B2 | 3/2020 | Haugsjaahabink | |
| 10,968,832 B2 | 4/2021 | Portolese et al. | |
| 2005/0072160 A1 | 4/2005 | Futa et al. | |
| 2005/0279079 A1* | 12/2005 | Baryshnikov | F02C 7/232 60/39.094 |
| 2011/0253231 A1* | 10/2011 | Dore | F01D 21/02 137/511 |

(Continued)

FOREIGN PATENT DOCUMENTS

| | | |
|---|---|---|
| EP | 1355054 A2 | 10/2003 |
| EP | 1557546 A1 | 7/2005 |
| FR | 2942499 A1 | 8/2010 |

OTHER PUBLICATIONS

European Search Report issued in corresponding European Patent Application No. 22209941.8 on Apr. 17, 2023.

*Primary Examiner* — Alain Chau
*Assistant Examiner* — Jingchen Liu
(74) *Attorney, Agent, or Firm* — Kinney & Lange, P. A.

(57) ABSTRACT

A fluid delivery system can include a main pump disposed in a primary fluid line configured to receive a low pressure fluid on a low pressure side and output a high pressure fluid on a high pressure side to provide flow from the fluid source to a fluid destination via the primary fluid line. An interconnected valve system can be disposed in the primary fluid line configured to control flow through the primary fluid line.

13 Claims, 1 Drawing Sheet

(56) References Cited

U.S. PATENT DOCUMENTS

| | | | |
|---|---|---|---|
| 2012/0085421 A1* | 4/2012 | Bickley | F02C 9/263 |
| | | | 137/2 |
| 2016/0305338 A1* | 10/2016 | Chapski | F02C 9/46 |
| 2017/0167390 A1* | 6/2017 | Haugsjaahabink | B64D 37/00 |
| 2017/0292451 A1* | 10/2017 | Reuter | F02C 7/22 |
| 2021/0102517 A1 | 4/2021 | Susca et al. | |

* cited by examiner

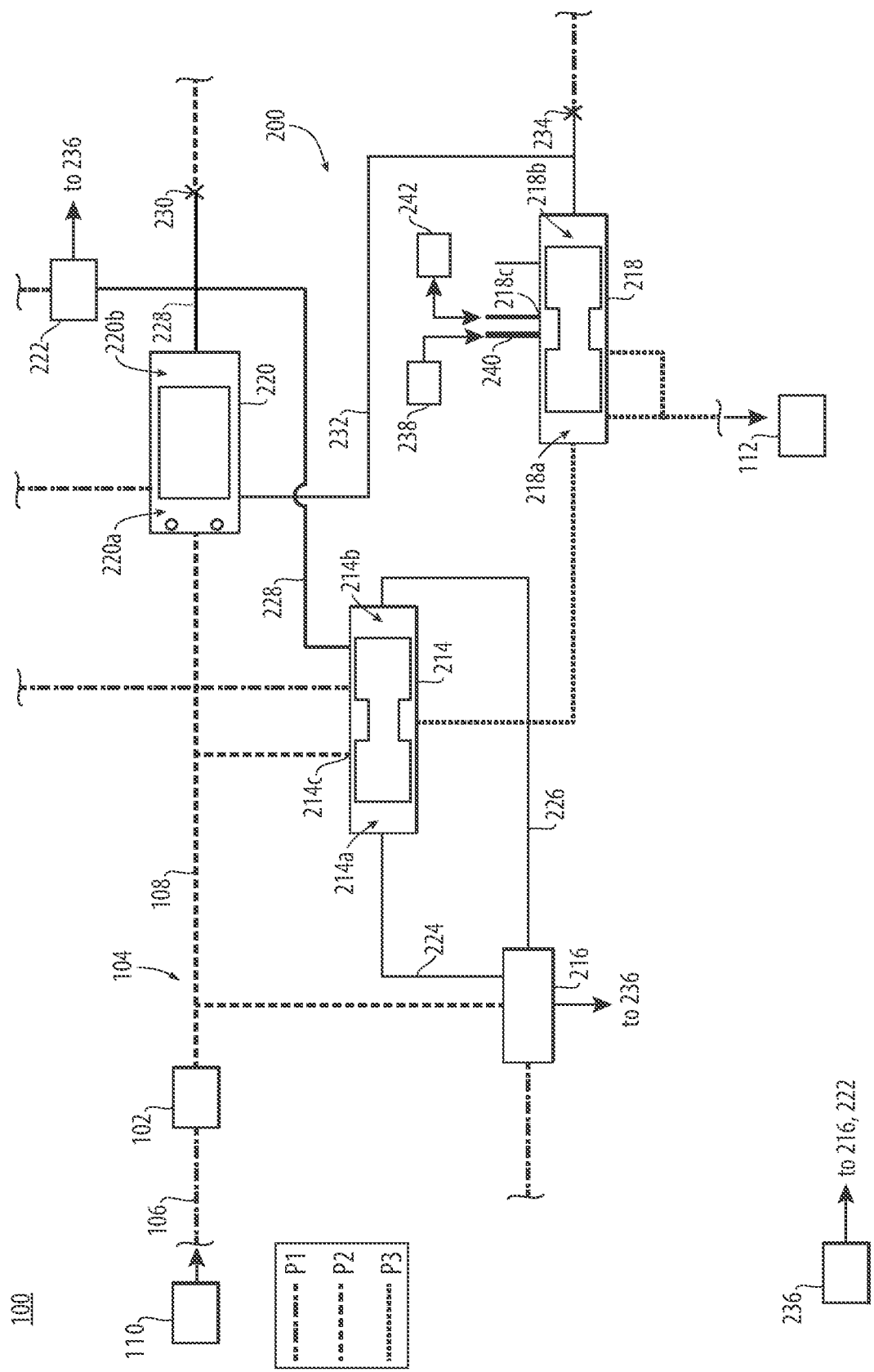

FLUID DELIVERY SYSTEM

TECHNICAL FIELD

The present disclosure relates to fluid delivery systems.

BACKGROUND

Fluid delivery systems (e.g., fuel delivery systems) must perform many functions in order to satisfy gas turbine engine requirements. Typically, these systems rely on pumps that may exceed a required capability for much of the operational envelope, for example either bypassing or throttling the excess flow/pressure. However, this can result in large parasitic power draws from the turbine. Additionally, typical systems can rely on large sets of electro-mechanical and interconnect devices ("EMIDs") and valves to perform functions such as shutoff, flow selection, for example.

There is always a need in the art for improvements to fluid delivery systems, for example that require fewer EMIDs and draw less parasitic power. This disclosure provides a solution for this need.

SUMMARY

In accordance with at least one aspect of this disclosure, a fluid delivery system includes, a main pump disposed in a primary fluid line configured to receive a low pressure fluid on a low pressure side and output a high pressure fluid on a high pressure side to provide flow from the fluid source to a fluid destination via the primary fluid line. An interconnected valve system can be disposed in the primary fluid line configured to control flow through the primary fluid line.

The interconnected valve system can include, a variable metering valve disposed in the high pressure side of the primary fluid line, downstream of the main pump, configured to meter flow from the pump to the fluid destination at a first pressure. A first controllable valve can be disposed in the primary fluid line, downstream of the main pump and parallel to the variable metering valve, configured to control a position of the variable metering valve. A non-variable valve can be disposed in the primary fluid line, downstream of the variable metering valve, configured to selectively allow flow from the variable metering valve to the fluid destination at a second pressure. A bypass valve can be disposed in the primary fluid line, downstream of the main pump and parallel to the variable metering valve, configured to control a state of a non-variable valve and to bypass a portion of high pressure fluid from the primary fluid line back to the low pressure side of the primary fluid line. A second controllable valve can be disposed in the low pressure side of the primary fluid line, configured to control a position of the bypass valve.

A first controllable pressure line can be fluidly connected between the first controllable valve and a first side of the variable metering valve to supply a pressure the first side of the variable metering valve. A second controllable pressure line can be fluidly connected between the first controllable valve and a second side of the variable metering valve, opposite the first side, to counteract pressure supplied to the first side of the variable metering valve by the first controllable pressure line.

In embodiments, the primary fluid line fluidly can connect to the bypass valve at a first side of the bypass valve, and a controllable bypass pressure line can fluidly connected between the second controllable valve, a second side of the bypass valve, opposite the first side, to counteract pressure supplied to the first side of the bypass valve, and the low pressure side of the primary fluid line through the variable metering valve.

In embodiments, the primary fluid line fluidly can connect to a first side of the non-variable valve, and a third controllable pressure line can be fluidly connected between the first side of the bypass valve and a second side of the non-variable valve, opposite the first side, to counteract pressure supplied to the first side of the non-variable valve by the high pressure fluid from the main pump in the primary fluid line.

In embodiments, the low pressure side of the primary fluid line can fluidly connect to one or more respective valves of the interconnected valve system, upstream of the main pump, configured to provide a back pressure on one or more of the respective valves of the interconnected valve system. In embodiments, the main pump and the variable metering valve can be configured to move between an open state and a closed state in a common direction. In embodiments, the variable metering valve and the non-variable valve can be configured to move between an open and closed state in a common direction. In embodiments, the bypass valve and the variable metering valve can be configured to move between an open and closed state in opposite directions.

A controller can be operatively connected to the interconnected valve system, having machine readable instructions. The machine readable instructions can be configured to cause the controller to control the interconnected valve system to provide a precise flow from the main pump to the fluid destination through the primary fluid line required for the fluid destination at all operating conditions.

In embodiments, the fluid destination can include at least one of a combustor of a gas turbine engine; an augmenter of a gas turbine engine, and/or one or more system actuators. In embodiments, the fluid can include at least one of fuel and/or hydraulic fluid. In embodiments, the first controllable valve can include an electro-hydraulic servo valve, the second controllable valve can include a solenoid valve, and the non-variable valve can include at least one of a shuttle valve and/or selector valve.

In certain embodiments, the fluid destination can be a primary fluid destination, and a secondary fluid source can be disposed in a secondary fluid line, fluidly connected to the non-variable valve configured to supply a secondary fluid to one of the primary fluid destination or a secondary fluid destination based on a state of the non-variable valve. In certain embodiments, the main pump can include a variable displacement pump.

In accordance with at least one aspect of this disclosure, a valve system, can include a variable metering valve disposed in a high pressure side of a primary fluid line, configured to meter flow from the high pressure side to a fluid destination at a first pressure. A first controllable valve can be fluidly connected to the variable metering valve via a first controllable pressure line and a second controllable pressure line, configured to control a position of the variable metering valve.

A non-variable valve can be fluidly connected downstream of the variable metering valve, configured to selectively allow flow from the variable metering valve to the fluid destination at a second pressure and configured to control the second pressure such that a pressure drop between the low pressure side of the main pump and the first pressure is maintained. A bypass valve can be fluidly connected to the variable metering valve via a controllable bypass pressure line, configured to control a state of the non-variable valve, and a second controllable valve can be fluidly connected to the variable metering valve via the controllable bypass pressure line and fluidly connected to the bypass valve via a third controllable pressure line, configured to control a position of the bypass valve.

In embodiments, the first controllable pressure line, the second controllable pressure line, the third controllable pressure line, and the controllable bypass pressure line can be configured to provide a counter acting pressure on at least one of the variable metering valve, the bypass valve, and/or the non-variable valve to counteract pressure supplied to variable metering valve, the bypass valve, and/or the non-variable valve from either the high pressure side of the primary fluid line or the low pressure side of the primary fluid line.

In accordance with at least one aspect of this disclosure, a method for controlling fluid delivery can include controlling an interconnected valve system disposed in a main fluid line of a fluid delivery system to provide a precise flow from a main pump through the primary fluid line required for a fluid destination at all operating conditions.

In embodiments, controlling can include, using a state of a first controllable valve disposed in the primary fluid line, downstream of the main pump to adjust a position of a variable metering valve disposed in the high pressure side of the primary fluid line, and using a state of a second controllable valve disposed in the primary fluid line, upstream of the main pump, to adjust a position of a bypass valve disposed in the primary fluid line, downstream of the main pump and upstream of the second controllable valve and to change a state of a non-variable valve disposed in the primary fluid line, downstream of the variable metering valve, to adjust flow from the main pump to the fluid destination based on the required flow for the fluid destination. In embodiments, the fluid destination can include at least one of a combustor of a gas turbine engine, an augmenter of a gas turbine engine, and/or one or more system actuators.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 1 is a schematic diagram in accordance with this disclosure, showing valves in a fluid delivery system.

DETAILED DESCRIPTION

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1. Other embodiments and/or aspects of this disclosure are described herein.

In accordance with at least one aspect of this disclosure, a fluid delivery system 100 can include a main pump 102 disposed in a primary fluid line 104 (e.g., as represented by the hashed lines) configured to receive a low pressure fluid on a low pressure side 106 (e.g., P1, a boost inlet pressure) and output a high pressure fluid on a high pressure side 108 (e.g., P2, a pump outlet pressure) to provide flow from a fluid source 110 to a fluid destination 112 via the primary fluid line 104. Any suitable pump is contemplated herein, for example the main pump 102 can be or include a variable displacement pump. An interconnected valve system 200 can be disposed in the primary fluid line 104 configured to control flow through the primary fluid line 104, for example, by controlling a pressure of the output flow (e.g., pressure 108) between the main pump 102 and the fluid destination 112.

The interconnected valve system 200 can include, a variable metering valve 214 disposed in the high pressure side 108 of the primary fluid line 104, downstream of the main pump 102. The variable metering valve 214 can be configured to meter flow from the main pump 102 to the fluid destination 112 at a first pressure (e.g., P2), where the first pressure can be the same or similar pressure to the high pressure output flow from the main pump 102. The output flow of the variable metering valve 214 can be at a second pressure (e.g., P3, a burn flow pressure for use in a combustor if the fluid destination 112 is a combustor). The variable metering 214 can have a first side 214a and a second side 214b opposite the first side 214a, where the primary fluid line 104 connects to the variable metering valve 214 at a location 214c between the first side 214a and the second side 214b. The variable metering valve 214 can translate between a first state (e.g., fully opening a window at location 214c when translated to the first side 214a), a second state (e.g., fully closing a window at location 214c when translated to the second side 214b), and any position in between (e.g., open at a window at or near location 214c).

A first controllable valve 216 can be disposed in the primary fluid line 104, downstream of the main pump 102 and parallel to the variable metering valve 214. The first controllable valve 216 can be configured to control a position of the variable metering valve 214. For example, the first controllable valve 216 can move between a first state (e.g., fully open on a first side) and a second state (e.g., fully open on a second side), and any position in between. Flow from either the high pressure side 108 and/or low pressure side 106 of the primary fluid line 104 may flow through the first controllable valve 216 to either the first side 214a and/or the second side 214b of the variable metering valve 214, to move the variable metering valve 214 by some amount, either closer to the first state or the second state.

A non-variable valve 218 can be disposed in the primary fluid line 104, downstream of the variable metering valve 214, configured to selectively control flow from the variable metering valve 214 to the fluid destination 112 at the second pressure (e.g., P3). The non-variable valve 218 can also be configured to provide a pressure drop such that P3 upstream of the valve is raised to bring the pressure difference between P2 and P1 to a certain minimum level. The non-variable valve 218 can have a first side 218a and a second side 218b opposite the first side 218a, where the primary fluid line 104 connects to the non-variable valve 218 at the first side 218a via line 105. In embodiments, the non-variable valve 218 can translate between only a first state (e.g., fully closed when translated to the first side 218a) and a second state (e.g., fully open when translated to on the second side 218b). In embodiments, the non-variable valve 218 and the metering valve 214 can be configured to translate in the same direction, wherein both valves can be open at the same time and closed at the same time. In certain embodiments, depending on the fluid destination, the non-variable valve 218 can act as a failsafe valve to keep an engine lit. In certain embodiments, the non-variable valve 218 can be a minimum pressurization selector and shut off valve configured to open and close in response to flow through a bypass valve 220.

The bypass valve 220 (e.g., as windmill bypass valve) can be disposed in the primary fluid line 104, downstream of the main pump 102 and parallel to the variable metering valve 214. The bypass valve 220 can have a first side 220a and a second side 220b opposite the first side 220a, where high pressure 108 fluidly connects to the bypass valve 220 at the first side 220a, and a signal pressure in a controllable bypass pressure line 228 connects to second side 220b. The signal pressure is connected to high pressure 108 through an orifice 230. The bypass valve 220 can be configured to control a state of the non-variable valve 218 and to bypass a portion of high pressure fluid back to the low pressure side 106 of the primary fluid line 104. For example, when the bypass valve 220 is open, pump flow (e.g., via a controllable pressure line) can be exposed to the second side 218b the non-variable valve 218, which shuttles the non-variable valve 218 to close on the first side 218a so that the primary flow 104 can bypass the fluid destination 112, and safely return to a low pressure side of the main pump 102, for example to prevent a deadhead at the pump 102.

The bypass valve 220 can translate between a first state (e.g., closed), a second state (e.g., open). During normal operation, the bypass valve 220 can be in the first state, and held in the first state by high pressure primary flow on the second side 220b of the bypass valve 220. When the bypass valve is open, low pressure primary flow, from either the variable metering valve 214 or a secondary controllable valve 222, can be exposed to the second side 220b of the bypass valve 220, such that high pressure primary flow on the first side 220a of the bypass valve can force the bypass valve 220 to the second state.

In embodiments, the bypass valve 220 can move in an opposite direction relative to the variable metering valve 214 and the non-variable valve 218. Therefore, when the variable metering valve 214 and non-variable valve 218 are at or near open, the bypass valve 220 can be at or near closed, and vice versa. In certain embodiments, the bypass valve 220 can be configured to control a pressure of the system 100. For example, by opening as pressure rises to avoid over pressurizing the system 100, and closing to add a pressure drop to keep the main pump 102 at a safe pressure rise (e.g., about 300 psi) to maintain control when the main pump 102 is scheduled for low or minimum flow.

The second controllable valve 222 can be disposed in the low pressure 106 of the primary fluid line 104. The second controllable valve 222 can be configured to control a position of the bypass valve 220. In certain embodiments, the second controllable valve 222 may act as a failsafe if the non-variable valve 218 becomes in operative. For example, the second controllable valve 222 can allow flow to be removed from the second side 220b of the bypass valve 220, reducing the pressure on the second side 220b of the bypass valve 220 and allowing the bypass valve 220 to open and allow the bypass of the primary flow.

Or, the second controllable valve 222 can block flow from escaping from the second side 220b of the bypass valve 220 to keep the bypass valve 220 in the first state so that flow from the primary fluid line 104 can reach the fluid destination through the non-variable valve 218. In this case, the position of the variable metering valve 214 can control the position of the bypass valve 220. For example, the first controllable valve 216 can command the variable metering valve 214 to the second state, fully closed when translated to the second side 214b, such that the controllable bypass pressure line 228 flow from the low pressure side 106 of the primary fluid line through the variable metering valve 214 to the second side 220b of the bypass valve 220. This allows the bypass valve 220 to open, bypassing the primary flow.

In order to provide counteracting pressure on each valve 214, 218, 220, 222, the system can include a number of controllable pressure lines. A first controllable pressure line 224 can fluidly connect between the first controllable valve 216 and the first side 214a of the variable metering valve 214 to supply a pressure the first side 214a of the variable metering valve 214 A second controllable pressure line 226 can fluidly connect between the first controllable valve 216 and the second side 214b of the variable metering valve 214. The second controllable pressure line 226 can counteract pressure supplied to the first side 214a of the variable metering valve 214. The pressure on the first side 214a and the second side 214b is controlled by adjusting a proportion of high pressure and low pressure primary flow through the first controllable valve 216. As pressure in line 224 is increased, the variable metering valve 214 is moved closer to the second positon, so any fluid on the second side 214b of the variable metering valve 214 is removed through line 226. The same, or similar, can be said in reverse for an increase in pressure in line 226.

In embodiments, a controllable bypass pressure line 228 can fluidly connect between the second controllable valve 222, the metering valve 214 (which can connect to the low pressure side 106 of the primary fluid line 104), and an orifice 230 connected to the high pressure side 108 of the primary fluid line to provide a stagnant high pressure maintaining the bypass valve 220 in the second, closed, position when the variable metering valve is in a medial state between the first and second state. The controllable bypass pressure line can provide a low pressure flow to allow the bypass valve 220 to move the first, open, position, when the variable metering valve 214 is fully closed on the second side 214b. A first in-line orifice 230 can be included in the primary fluid line 104 between the second side 220b of the bypass valve 220, and a high pressure reference to restrict high pressure primary fluid from entering the bypass valve 220 at the second side 220b when the bypass valve 220 is open. For example, the orifice 230 can be sized such that when the controllable bypass pressure line 228 is communicating low pressure primary fluid to the bypass valve 220, the high pressure primary flow cannot flow fast enough through the orifice 230 to pressurize the bypass pressure line 228, which acts on the second side 220b of the bypass valve.

In embodiments, a third controllable pressure line 232 can fluidly connect between the first side 220a of the bypass valve 220 and the second side 218b of the non-variable valve 218 to counteract pressure supplied to the first side 218a of the non-variable valve 218 by the primary flow in the primary fluid line 104. A second in-line orifice 234 can be included in the primary fluid line 104 between the second side 218b of the non-variable valve 218, and a low pressure reference to allow low pressure primary fluid to enter the non-variable valve 218 at the second side 218b, when the bypass valve 220 is closed. The orifice 234 can be sized such that when the bypass valve 220 is open, high pressure fluid in the third controllable pressure line 232 does not escape to the low pressure side 106 of the primary fluid line 104.

In embodiments, the low pressure side 106 of the primary fluid line can be fluidly connected to one or more respective valves of the interconnected valve system 200, upstream of the main pump 102, configured to provide a back pressure one or more of the respective valves. In certain embodiments, certain of the respective valves may include a relief outlet configured to return flow from the high pressure side 108 of the primary fluid line 104 to the low pressure side 106 of the primary fluid line 104.

In embodiments, a controller 236 can be operatively connected to the interconnected valve system 200 (e.g., at one or more of the controllable valves), having machine readable instructions, configured to cause the controller 236 to control the interconnected valve system 200 to provide a precise flow from the main pump 102 to the fluid destination 112 through the primary fluid line 104 required for the fluid destination 112 at all operating conditions, for example by controlling pump displacement, an engine speed, or the like. In certain embodiments, the controller 236 can be or include a full authority digital engine controller (FADEC), or any other suitable controller.

In embodiments, the controller 236 can be or include both hard wired circuits that cause a logic (e.g., predictive) to be executed, and/or software-based components, for example, simple electric circuits employing analogue components, or the controller can include a CPU, a memory, machine readable instructions in the memory that when executed cause the CPU to perform a method or cause the control system to perform a method, for example as described below. In embodiments, the controller can utilize any suitable algorithm to control the controllable valves, pump, and/or valve system in any manner as described herein. In embodiments, the algorithm could be constructed using the functionality as described above in addition to known general engineering principles as applied to the specific characteristics of each particular fuel system to which the technology of the present disclosure is applied.

In certain embodiments, a secondary fluid source 238 can be disposed in a secondary fluid line 240, fluidly connected to the non-variable valve 218 configured to supply a secondary fluid to either the fluid destination 112 or a secondary fluid destination 242 through the non-variable valve 218. The secondary fluid line 240 can connected to the non-variable valve 218 at a location 218c. In certain embodiments, the fluid destination (e.g., either or both of the fluid destination 112 and the secondary fluid destination 242) can be at least one of a combustor of a gas turbine engine, an augmenter of a gas turbine engine, and/or one or more system actuators. Any suitable combination of fluid destinations 112, 242 is contemplated herein. Depending on the fluid destination 112, 242, the fluid can be or include at least one of fuel and/or hydraulic fluid.

In accordance with at least one aspect of this disclosure, a valve system (e.g., valve system 200), for example for fluid delivery, can include any suitable number and types of valves as described herein, having any suitable interconnected fluid lines. For example, the valve system can include, at least a variable metering valve (e.g., metering valve 214), and a first controllable valve (e.g., first controllable valve 216) fluidly connected to the variable metering valve via a first controllable pressure line (e.g., line 224) and a second controllable pressure line (e.g., line 226), configured to control a position of the variable metering valve.

The valve system can also include a non-variable valve (e.g., selector or shut off valve 218) fluidly connected downstream of the variable metering valve, configured to selectively allow flow from the variable metering valve to the fluid destination at a second pressure (e.g., a burn flow pressure) and a bypass valve (e.g., bypass valve 220) fluidly connected to the variable metering valve via a controllable bypass pressure line (e.g., line 228), configured to control a state of the non-variable valve. A second controllable valve (e.g., valve 222) can be fluidly connected to the variable metering valve via the controllable bypass pressure line and fluidly connected to the bypass valve via a third controllable pressure line (e.g., line 232), configured to control a position of at least one of the variable metering valve and/or the bypass valve.

In embodiments, the first controllable pressure line, the second controllable pressure line, the third controllable pressure line, and the controllable bypass pressure line can be configured to provide a backpressure on at least one of the variable metering valve, the bypass valve, and/or the non-variable valve to counteract pressure supplied to variable metering valve, the bypass valve, and/or the non-variable valve from the high pressure side of the primary fluid line. In certain embodiments, the first controllable valve can include an electro-hydraulic servo valve, the second controllable valve can include a solenoid valve, and the non-variable valve can include at least one of a shuttle valve and/or selector valve.

In accordance with at least one aspect of this disclosure, a method for controlling fluid delivery, can include controlling an interconnected valve system (e.g., valve system 200) disposed in a main fluid line (e.g., line 104) of a fluid delivery system (e.g., system 100) to provide a precise flow from a main pump (e.g., pump 102) through the primary fluid line required for a fluid destination (e.g., destination 112, 242) at all operating conditions.

In embodiments, controlling can include, using a state of a first controllable valve (e.g., valve 216) disposed in the primary fluid line, downstream of the main pump to adjust a position of a variable metering valve (e.g., valve 214) disposed in the high pressure side of the primary fluid line. The method can also include, using a state of a second controllable valve (e.g., valve 222) disposed in the primary fluid line, downstream of the main pump, to adjust a position of a bypass valve (e.g., valve 220) disposed in the primary fluid line, downstream of the main pump and upstream of the second controllable valve, and to change a state of a non-variable valve (e.g., valve 218) disposed in the primary fluid line, downstream of the variable metering valve. Controlling the valves in the valve system thus allows for adjusting flow from the main pump to the fluid destination based on the required flow for the fluid destination.

In embodiments, the fluid delivery system can safely accommodate a no-bypass pumping system through the use of two independent electric shutoff systems. For example, in certain embodiments, the first controllable valve may command the variable metering valve to a position such that the low pressure side of the primary fluid line is exposed to the second side of the bypass valve. In certain embodiments, the second controllable valve may open to allow the low pressure side of the primary fluid line to be exposed to the second side cavity of the bypass valve, thereby opening the bypass valve. When the bypass valve is opened, pump flow can be exposed to the second side of the non-variable valve, through the third controllable pressure line, which can shuttle the non-variable valve closed, preventing leakage to the fluid destination, and high pressure primary flow can be safely returned to the low pressure side of the primary fluid line, bypassing the fluid destination. With the non-variable valve closed, a secondary fluid delivery line may flow through the non-variable valve from a secondary fluid source to the main fluid destination. When the non-variable valve is open, the secondary fluid delivery line may provide fluid from the secondary fluid source to a secondary fluid destination.

An interconnected valve system allows for controlling a single controllable valve, so that any other non-controllable valves will operate in response to the change in the controllable valve. Therefore, each valve does not need to be independently controlled by a separate controller, or even by a single controller.

Embodiments can allow for removal of a bypass metering valve system, can provide for a secondary source selection, can provide pump protection when flow demand not present, and min pressure regulation for low flow demands. Embodiments can reduce the total number of EMIDs in the system, which can in turn reduce the number of control modes, reduce I/O into the system controller, and reduce weight and cabling.

As used herein "high" pressure and "low" pressure are used to describe the pressures in the fluid delivery system relative to one another, as appreciated by one having ordinary skill in the art. Therefore, "low" pressure means a pressure less than pressure designated as "high" pressure and "high" pressure means a pressure greater than pressure designated as "low" pressure. For example, the pressure on the inlet side of the pump is low pressure because it is less than the pressure on the outlet side of the pump.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

What is claimed is:

1. A fluid delivery system, comprising:
a main pump disposed in a primary fluid line configured to receive a low pressure fluid on a low pressure side of the primary fluid line and output a high pressure fluid to a high pressure side of the primary fluid line to provide a flow from a fluid source to a fluid destination via the primary fluid line; and
an interconnected valve system disposed in the primary fluid line configured to control the flow flowing through the primary fluid line, the interconnected valve system comprising:
a variable metering valve disposed in the high pressure side of the primary fluid line downstream of the main pump, the variable metering valve configured to receive the flow from the main pump at a first pressure and meter the flow to the fluid destination at a second pressure, wherein the variable metering valve comprises a first side and a second side opposite to the first side;
a first controllable valve disposed in the primary fluid line downstream of the main pump and parallel to the variable metering valve, the first controllable valve configured to control a position of the variable metering valve, wherein a first controllable pressure line fluidly connects between the first controllable valve and the first side of the variable metering valve to supply a first pressure reference to the first side of the variable metering valve, a second controllable pressure line fluidly connects between the first controllable valve and the second side of the variable metering valve to supply a second pressure reference, and the first pressure reference counteracts the second pressure reference;
a non-variable valve disposed in the primary fluid line downstream of the variable metering valve, the non-variable valve configured to selectively allow the flow flowing from the variable metering valve at the second pressure to the fluid destination;
a bypass valve disposed in the high pressure side of the primary fluid line downstream of the main pump and parallel to the variable metering valve such that the bypass valve and the variable metering valve are both fluidly connected to an outlet of the main pump to receive the flow from the main pump at the first pressure, the bypass valve configured to control a state of the non-variable valve and configured to bypass a portion of the flow at the first pressure from the high pressure side of the primary fluid line back to the low pressure side of the primary fluid line, and wherein the bypass valve comprises a first side and a second side opposite to the first side, and the primary fluid line fluidly connects to the bypass valve at the first side of the bypass valve to supply the flow at the first pressure to the first side of the bypass valve;
a second controllable valve disposed in the low pressure side of the primary fluid line fluidly connected to the variable metering valve and the bypass valve via a controllable bypass pressure line, the second controllable valve configured to control a position of the bypass valve,
wherein the controllable bypass pressure line is fluidly connected to the second side of the bypass valve to supply a third pressure reference, and the third pressure reference counteracts the flow at the first pressure supplied to the first side of the bypass valve by the primary fluid line, and wherein the controllable bypass pressure line fluidly connects to the low pressure side of the primary fluid line through the variable metering valve and the second controllable valve.

2. The fluid delivery system as recited in claim 1, wherein the non-variable valve further comprises a first side and a second side opposite to the first side, and the interconnected valve system further comprises a third controllable pressure line,
wherein the primary fluid line fluidly connects to the first side of the non-variable valve through the variable metering valve to supply the flow at the second pressure to the first side of the non-variable valve, the third controllable pressure line is fluidly connected between the first side of the bypass valve and the second side of the non-variable valve to supply a fourth pressure reference to the second side of the non-variable valve, and the fourth pressure reference counteracts the flow at the second pressure supplied to the first side of the non-variable valve the variable metering valve.

3. The fluid delivery system as recited in claim 1, wherein the low pressure side of the primary fluid line is fluidly connected to one or more valves of the variable metering valve, the first controllable valve, the non-variable valve, the bypass valve, and the second controllable valve in order to provide a back pressure to the one or more valves as one or more pressure references of the first pressure reference, the second pressure reference, and the third pressure reference.

4. The fluid delivery system as recited in claim 1, wherein the position of the variable metering valve includes a first position and a second position and the state of the non-variable valve includes an open state and a closed state,
wherein the variable metering valve is configured to move between the first position and the second position in a common direction relative to the non-variable valve, such that when the variable metering valve is in the first position, the non-variable valve is at the open state, and when the variable metering valve is in the second position, the non-variable valve is at the closed state.

5. The fluid delivery system as recited in claim 4,
wherein the position of the bypass valve includes an open position and a closed position,
wherein the bypass valve and the variable metering valve are configured to move in opposite directions relative to one another such that when the variable metering valve is in the first position, the bypass valve is at the closed position, and when the variable meting valve is in the second position, the bypass valve is at the open position.

6. The fluid delivery system as recited in claim 1, further comprising a controller operatively connected to the interconnected valve system, the controller having machine readable instructions, the machine readable instructions are configured to cause the controller to:
control the interconnected valve system to provide a precise amount of the flow from the main pump to the fluid destination through the primary fluid line required for the fluid destination at all operating conditions.

7. The fluid delivery system as recited in claim 6, wherein the fluid destination includes at least one of a combustor of a gas turbine engine, an augmenter of the gas turbine engine, and/or one or more system actuators.

8. The fluid delivery system as recited in claim 7, wherein the fluid source includes at least one of a fuel source and/or a hydraulic fluid source.

9. The fluid delivery system as recited in claim 1, wherein the fluid destination is a primary fluid destination, and wherein the fluid delivery system further comprises a secondary fluid source disposed in a secondary fluid line, wherein the secondary fluid source is fluidly connected to the non-variable valve and configured to supply a secondary flow to one of the primary fluid destination or a secondary fluid destination based on the state of the non-variable valve.

10. The fluid delivery system as recited in claim 1, wherein the main pump includes a variable displacement pump.

11. The fluid delivery system as recited in claim 1, wherein the first controllable valve is an electro-hydraulic servo valve.

12. The fluid delivery system as recited in claim 1, wherein the second controllable valve is a solenoid valve.

13. The fluid delivery system as recited in claim 1, wherein the first controllable valve is an electro-hydraulic servo valve, and wherein the second controllable valve is a solenoid valve.

* * * * *